United States Patent
Schelkmann

[11] 3,884,740
[45] May 20, 1975

[54] METHOD OF RETREADING TIRES

[76] Inventor: Wilhelm Schelkmann, Crengeldanzstr 85a, D.581 Witten, Germany

[22] Filed: Sept. 20, 1973

[21] Appl. No.: 399,060

[52] U.S. Cl.............. 156/96; 156/129; 156/394 FM
[51] Int. Cl..... B29h 5/04; B60c 11/00; B60c 21/00
[58] Field of Search...... 156/96, 110, 123, 126–129, 156/394, 394 FM

[56] References Cited
UNITED STATES PATENTS

| | | | |
|---|---|---|---|
| 2,966,936 | 1/1961 | Schelkmann | 156/96 |
| 3,207,647 | 9/1965 | Schelkmann | 156/394 |
| 3,730,801 | 5/1973 | Martin | 156/96 |
| 3,745,084 | 7/1973 | Schelkmann | 156/96 |
| 3,793,116 | 2/1974 | Schelkmann | 156/96 |
| 3,802,978 | 4/1974 | Barnett | 156/96 |

FOREIGN PATENTS OR APPLICATIONS

| | | | |
|---|---|---|---|
| 92,699 | 1959 | Netherlands | 156/96 |

Primary Examiner—Clifton B. Cosby
Assistant Examiner—John E. Kittle
Attorney, Agent, or Firm—Michael S. Striker

[57] ABSTRACT

An assembly is formed from a tire carcass having a U-shaped cross-section, a tread strip on the peripheral surface of this carcass and a layer of binder material sandwiched between the surface and the tread strip. The thus formed assembly is then surrounded over the entire circumference of the carcass with a flexible annular envelope having marginal portions defining with the assembly at least one gap which communicates with the interior of the envelope. This gap is then sealed by interposing in it, under pressure, between the assembly and at least one of the marginal portions, an annular elastic cord of foam rubber or the like.

6 Claims, 5 Drawing Figures

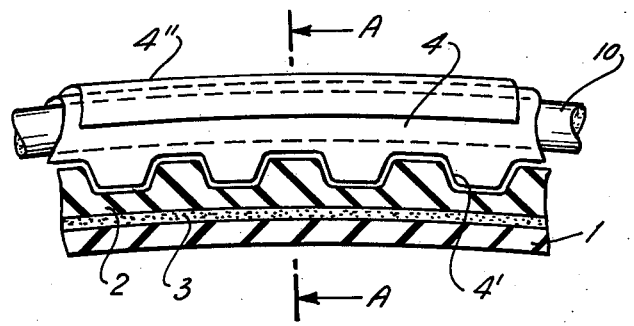
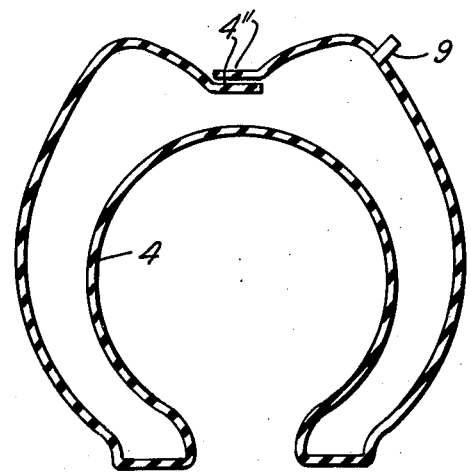
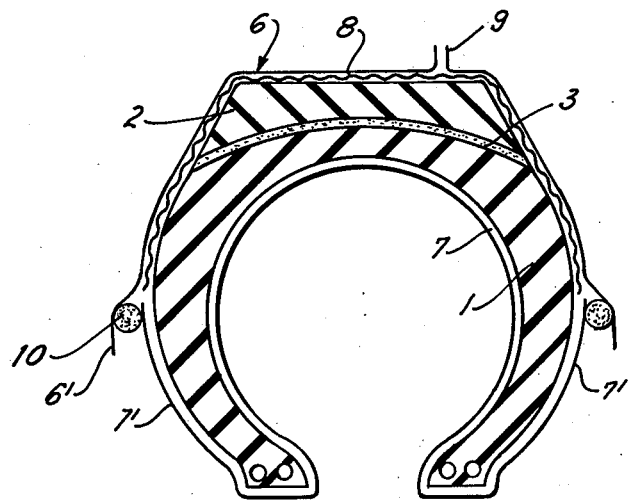

METHOD OF RETREADING TIRES

BACKGROUND OF THE INVENTION

The present invention relates generally to a method of retreading tires, and more particularly, to a method of repairing the worn peripheral surface of a tire carcass by bonding a tread strip to this surface with a layer of binder material sandwiched between the thread strip and the tire surface.

Various methods are already known in the prior art to repair tires in the aforementioned manner. Generally speaking, an assembly is formed from the tire carcass, the tread strip is placed upon the peripheral or circumferential surface of the tire carcass, and a binder material is sandwiched between this surface and the tread strip. Thereupon, the thus-formed assembly is placed into a flexible envelope from which air is evacuated, before the already pre-vulcanized tread strip is vulcanized onto the tire carcass. The purpose of the evacuation of the air is to preclude any air enclosures forming between the tread strip and the carcass because this could lead to separation of the tread strip from the carcass.

It is most important that the interior of the flexible envelope be tightly sealed, so that the interior is tight with respect to the medium surrounding the envelope during the vulcanization process, for instance steam or the like. Heretofore, it is not possible to obtain an absolutely reliable sealing effect under these circumstances. For instance, it was always observed that the lateral profile provided on the side faces of the tire carcass, for instance technical data, manufacturer's name or the like which are formed as raised letters and symbols in the side faces, have breached the integrity of the seal and permitted the entry of surrounding medium into the flexible envelope. Another source of difficulty in this respect was that with large-size tires, and with tires having deep profiles, under exterior over-pressure the flexible envelope tended to be deflected into the spaces between the profiles and to become thereby stretched, again breaching the integrity of the seal. Moreover, the life expectancy of these envelopes was disadvantageously affected under these circumstances.

SUMMARY OF THE INVENTION

It is accordingly an object of the present invention to overcome the disadvantages of the prior art.

More particularly, it is an object of the present invention to provide an improved method of retreading tires wherein the interior of the envelope in which a retreading assembly is accommodated, is reliably sealed off with respect to the ambient atmosphere.

Another object of the invention is to provide a method of this type wherein the life expectancy of the envelope used during the retreading operation, is substantially increased, especially with respect to those envelopes used on large tires or tires having deep tread profiles.

In keeping with these objects, and with others which will become apparent hereafter, one feature of the invention resides in a method of retreading tires, which, briefly stated, comprises the steps of forming an assembly from a tire carcass having a U-shaped cross-section, a tread strip on the peripheral surface of the carcass, and a layer of binder material sandwiched between the surface and the tread strip. The thus formed assembly is then surrounded over the entire circumference of the carcass with a flexible annular envelope having marginal portions which define with the assembly at least one gap communicating with the interior of of the envelope. This gap is sealed by interposing in it between the assembly and at least one of the marginal portions, an annular elastic cord which is in sealing engagement with the assembly and with the marginal portion.

The cord itself may be in form of a single or multiple cord of circular cross-section, and it may be of natural or synthetic plastic cellular material, such as rubber or the like. It is advantageous if the material from which the cord is made has the same specific gravity as does water.

The cord is highly stretchable, and is pressed by the inward force exerted by the stretched envelope, against the surface of the carcass or the tread strip.

Cords of the type mentioned above have a long life expectancy and are so strong and so elastic that in conjunction with the pressure exerted upon them by the envelope, a reliable sealing effect at any part of the assembly is obtained, even at the lateral side faces of the tire carcass, where the aforementioned names or indicia are provided in form of raised letters or symbols.

In order to eliminate difficulties in conjunction with substantial stretching of the envelope, that is difficulties of the type encountered in the prior art, as outlined earlier, it is possible and in certain instances advantageous to use an envelope which is of larger diameter than necessary to accommodate the assembly. In this case, a cord is used having such a diameter as to assure that it sufficiently stretches the envelope when interposed between it and the assembly, to provide for a reliable sealing effect.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a fragmentary partly sectioned view on an enlarged scale;

FIG. 3 is a view similar to FIG. 1 illustrating a further embodiment of the invention; and FIG. 4 is a diagrammatic cross-section through a particular type of envelope which can be used according to the present invention.

DESCRIPTION OF THE PREFERRED EMBODIMENTS

Figure 1A:
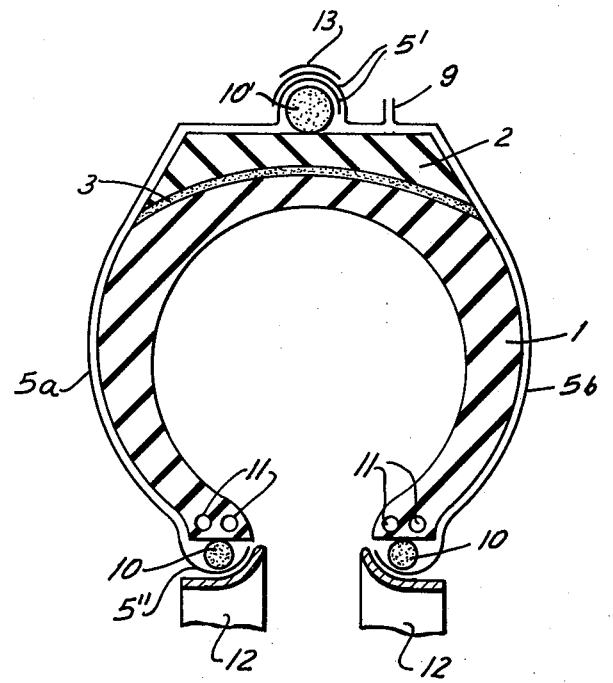
FIG. 1a is a section taken on line A—A of FIG. 2, illustrating one embodiment of the invention.

Before entering into a detailed discussion of the drawing, it is emphasized that the various embodiments illustrated show cross-sectional views which serve for the purpose of facilitating an explanation of the novel method.

With this in mind, and referring firstly to FIG. 1a, it will be seen that this embodiment shows a cross-section through a tire carcass 1, onto the worn-away circumferential peripheral surface of which is placed a tread strip 2 which serves for retreading of the tire, that is to provide the carcass 1 with new road-engaging treads or profiles. Interposed between the surface of the carcass 1 and the tread strip 2 is a layer 3 of a suitable binder material of one of the types which are well known to those skilled in the art. The tread strip 2 is to be vulcanized onto the carcass 1 by means of the binder material layer 3.

Before this vulcanization can be carried out, the assembly is placed into an annular envelope of flexible material, for instance polyvinylchloride or the like, which is composed of two sections 5a and 5b. First marginal portions 5' of the sections 5a and 5b overlap one another adjacent the circumferentially extending surface of the tread strip 2; second marginal portions 5" overlap the respective beads 11 of the tire carcass 1.

In accordance with the present invention, the sealing of the gaps defined between the tread strip 2 and the portions 5', on the one hand, and between the beads 11 and the portions 5" on the other hand, is accomplished by utilizing annular cords 10, 10' of sealing material, preferably of cellular sealing material, such as synthetic foam rubber or the like. These strong and highly extensible cords are employed in the manner illustrated in FIG. 1a. In other words, the cord 10' is placed around the circumferential surface of the tread strip 2, being stretched as necessary, and tightly engages this surfaces as it tends to contract. On the other hand, the cord 10' is itself tightly engaged by the marginal portions 5' which overlap one another and the cord 10'. In fact, the dimensions of the envelope portions 5a and 5b can be chosen larger than required, and the diameter of the cord 10' can be chosen sufficiently large to assure that the marginal portions 5' will be stretched sufficiently to be in tight sealing engagement with the cord 10'. The sealing engagement does, of course, exist, although in FIG. 1a, the marginal portions 5' and the cord 10' have been shown out of contact for the sake of clearer illustration. The sealing effectiveness can be further enhanced by placing a stretchable band 13 — for instance of synthetic rubber or synthetic plastic material, such as polyvinylchloride — around the overlapped marginal portions 5'. The band 13 may be an endless band which is stretched analogously to a rubber band and which then urges the marginal portions 5' into contact with each other and with the cord 10' as it tends to contract, or it could also be an inextensible band and could be cinched together by means of an appropriate device.

The marginal portions 5" have interposed between themselves and the respectively associated beads 11 of the tire carcass 1, further elastic cords 10 corresponding to but not necessarily having the same diameter as the cord 10'. They are pressed into sealing engagement with the beads 11, and the marginal portions 5' are pressed into sealing engagement with the cords 10, by means of clamping rings or other jigs 12 which are only fragmentarily illustrated in FIG. 1a. Such jigs are well known in the art.

Valve 9 is provided by means of which the gas enclosed in the envelope 5a, 5b can be evacuated before the vulcanization begins. The valve 9 is only diagrammatically shown, being of a conventional type, well known in this field and can of course be closed to prevent the entry of surrounding atmosphere into the interior of the envelope 5a, 5b once the same is sealed with respect to the assembly as shown in FIG. 1a. In this manner, a vacuum can be produced and maintained in this interior. More than one valve 9 can, of course, be provided. The ring or rings (it is possible to use a single one which engages both of the marginal portions 5") may be provided with retaining hooks or the like, which further serve to more reliably hold the portions 5" in place during the vulcanization.

Figure 1B:
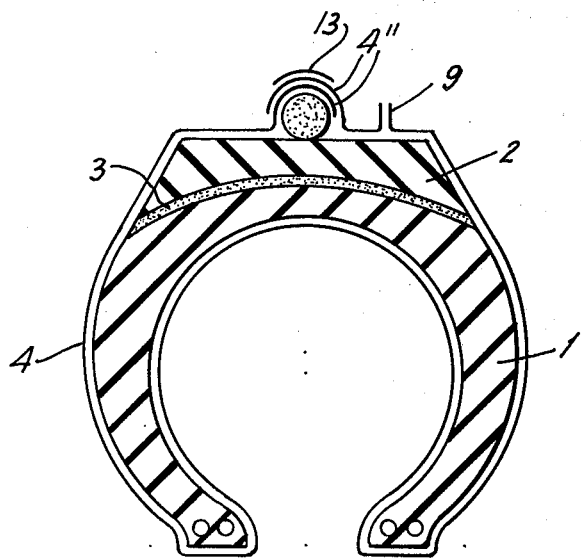
FIG. 1b is a section also taken on line A—A of FIG. 2, but illustrating a somewhat different embodiment of the invention.

FIG. 1b is analogous to FIG. 1a, but uses a one-piece envelope 4. Like reference numerals identify the same components as in FIG. 1a.

In FIG. 1b, however, the one-piece envelope has evidently only one set of marginal portions, namely the overlapping marginal portions 4" which are shown. In all other respects, the embodiment of FIG. 1b corresponds to that of FIG. 1a.

Here, also, the diameter of the envelope 4 may be chosen to be substantially larger than would be necessary to accommodate the assembly of the elements 1, 2, and 3. The diameter of the elastic cord 10, which here corresponds to the elastic cord 10' of FIG. 1a, may again be so selected as to compensate for this over-dimensioning of the envelope 4, that is it may be at least equal to and preferably greater than the difference between the outer diameter of the assembly measured over the outer surface of the tread strip, and the inner diameter of the envelope 4. In fact, the diameter of the cord 10 can be selected at will, and in such a manner as to obtain any desired sealing contact between the cord 10 and the tread strip surface on the one hand, and the cord 10 and the marginal portions 4" (it will be recalled that the envelope 4 may be stretched by appropriate selection of the cord diameter) on the other hand. The extensibility of the cord 10, must, of course, be such that after use it will return to its original diameter, that is it will contract to the diameter which it had before it was stretched and placed around the assembly 1, 2 and 3.

FIG. 2 shows in particular the advantage of making the diameter of e.g. the sleeve 4 larger than is inherently required by the outer diameter of the assembly 1, 2 and 3. When this is done, the envelope 4 can be deflected under the influence of external over-pressure to the configuration shown at 4', that is down into the recesses between the tread profiles of the strip 2. It will be recalled that it has been pointed out earlier that if the recesses between the tread profiles are deep, or putting this in another way, if the tread profiles are high, the prior-art envelopes have been stretched to the point where they no longer provided an appropriate seal. This is avoided by the present invention, where resort to the method step of using an over-dimensioned envelope permits such stretching without disadvantageous consequences in terms of the sealing effect obtained. Moreover, the life time of the envelope is thereby also increased because the envelope need be stretched less to be displaced to the configuration shown at 4'.

FIG. 3 shows a further possibility, wherein again like reference numerals identify like components. In FIG. 3, however, the envelope is composed of an upper envelope portion 6 having marginal portions 6', and a lower envelope portion 7 having marginal portions 7'. The lower envelope portion 7 surrounds the interior of the carcass 1, as well as part of the outer side faces thereof, and the remainder of the assembly is surrounded by the upper envelope portion 6. In the prior art it has been very difficult to provide a proper seal at the point where the marginal portions 6' and 7' overlap, namely on the side faces of the carcass 1, because of the earlier mentioned indicia and the like, which form roughnesses and unevennesses where heretofore sealing has not been very effective. According to the present invention, however, cords 10 are again used which are applied exteriorly of the marginal portions 7', and pressing the same against the side faces at the opposite sides of the carcass 1, and which in turn, are exteriorly engaged under pressure by the marginal portions 6'. By appropriately dimensioning the envelope portion 6, the latter can exert with its marginal portions 6' sufficient pressure upon the cords 10 to sealingly compress the same and establish a reliable seal. Of course, the relative location of the marginal portions 6' and 7' could be reversed if desired.

Coming, finally, to FIG. 4, it will be seen that this diagrammatically illustrates that it may be advantageous to have the parts of the envelope, which are provided with the respective marginal portions, be of reduced diameter, as compared with the remainder of the envelope. This is shown in FIG. 4 on hand, of the one-piece envelope 4, which will be clearly seen to be of reduced diameter in the region where it is provided with the marginal portions 4''. The same can of course be done with the envelope composed of the portions 5a and 5b, and with the envelope composed of the portions 6 and 7. The purpose is to obtain an increased pressure upon the respective cord 10 or 10', and to further increase the sealing effect obtained.

It will be understood that each of the elements described above, or two or more together, may also find a useful application in other types of applications differing from the types described above.

While the invention has been illustrated and described as embodied in a method of retreadting tires, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a method of retreading tires, the steps of forming an assembly from a tire carcass having a U-shaped cross-section, a profiled tread strip on the peripheral surface of said carcass, and a layer of binder material sandwiched between said surface and said tread strip; stretching an elastic annular cord onto the radially outermost peripheral portion of the profiled tread strip so that it presses radially inwardly against the profiled tread strip; surrounding the thusly formed assembly over the entire circumference of said carcass with a flexible annular envelope not permanently connected to said annular cord and comprised of a first and a second marginal portion defining together with said assembly at least one gap communicating with the interior of the envelope; and sealing said gap by stretching said first marginal portion over said annular cord to such an extent that said first marginal portion stays in place stretched over said annular elastic cord by virtue of the tension in the thusly stretched first marginal portion, and then stretching said second marginal portion over said annular cord and over said first marginal portion to such an extent that said second marginal portion afterwards stays in place stretched over said annular elastic cord and over said first marginal portion by virtue of the tension in the thusly stretched second marginal portion.

2. In a method as defined in claim 1, wherein said carcass has two annular beads, and wherein said envelope has two additional marginal portions each defining with a respective one of said beads a respective additional gap; and further including the step of sealing off said additional gaps by interposing an annular elastic cord between one of said beads and one of said additional marginal portions and a further annular elastic cord between the other of said beads and the other of said additional marginal portions.

3. In a method as defined in claim 1; and further including the step of placing an elastic band permanently connected to neither said marginal portions nor to said annular cord coaxially around the overlapping first and second marginal portions and accordingly around said annular cord, so as to exert a supplemental force holding said stretched marginal portions in place stretched over said annular cord.

4. In a method as defined in claim 1, wherein the step of sealing comprises utilizing a cord made from a material having the same specific gravity as water.

5. In a method as defined in claim 1, wherein said envelope is of one piece.

6. In a method of retreading tires, the steps of forming an assembly from a tire carcass having a U-shaped cross-section, a profiled tread strip on the peripheral surface of said carcass, and a layer of binder material sandwiched between said surface and said tread strip; surrounding the thusly formed assembly over the entire circumference of said carcass with a flexible annular envelope comprised of membrane material and having marginal envelope membrane portions which define with said assembly at least one gap communicating with the interior of the envelope; and sealing said gap by interposing in it, between said assembly and at least one of said marginal portions, an annular elastic cord which is in sealing engagement with said assembly and with said one marginal portion but not permanently connected to said one marginal portion, said step of sealing comprising stretching said one marginal envelope membrane portion over said annular cord to such an extent that said one marginal envelope membrane portion afterwards stays in place stretched over said annular elastic cord by virtue of the tension in the thusly stretched marginal envelope membrane portion.

* * * * *